(12) United States Patent
Shiono et al.

(10) Patent No.: US 8,728,612 B2
(45) Date of Patent: May 20, 2014

(54) INK JET RECORDING METHOD

(71) Applicant: Seiko Epson Corporation, Tokyo (JP)

(72) Inventors: Shohei Shiono, Matsumoto (JP); Ippei Okuda, Shiojiri (JP); Shoki Kasahara, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/665,088

(22) Filed: Oct. 31, 2012

(65) Prior Publication Data

US 2013/0108842 A1 May 2, 2013

(30) Foreign Application Priority Data

Nov. 2, 2011 (JP) .................................. 2011-240915

(51) Int. Cl.
*B32B 3/00* (2006.01)

(52) U.S. Cl.
USPC ........................................ 428/195.1; 347/102

(58) Field of Classification Search
USPC ........................................ 428/195.1; 347/102
See application file for complete search history.

(56) References Cited

U.S. PATENT DOCUMENTS

| 8,398,199 B2 * | 3/2013 | Verdonck .................... 347/15 |
| 2010/0105807 A1 | 4/2010 | Sugita et al. | |

FOREIGN PATENT DOCUMENTS

| JP | 2008-248008 | 10/2008 |
| WO | 2010/050618 | 5/2010 |
| WO | 2011/007888 | 1/2011 |

* cited by examiner

*Primary Examiner* — Elizabeth Mulvaney
(74) *Attorney, Agent, or Firm* — Harness, Dickey & Pierce, P.L.C.

(57) ABSTRACT

With a white image where the dryness factor is 40% to 80%, since drying has appropriately progressed, it becomes difficult for the white image and color ink to mix, and in addition, it is possible to suppress wetting and spreading of the color ink when a color image is recorded using an ink jet method with color ink which contains a colorant. Accordingly, it is possible to obtain an ink jet recording method where deterioration in image quality is suppressed.

20 Claims, 2 Drawing Sheets

INK JET RECORDING METHOD

BACKGROUND

1. Technical Field

The present invention relates to an ink jet recording method for recording on a foundation layer which is formed on a recording medium.

2. Related Art

There is a recording method where a white region is formed as a foundation layer on a transparent recording medium, for example, a transparent resin film, by performing foundation printing using white ink for improving visibility, and recording of a character, an image, or the like is performed on the white region using a color ink (for example, JP-A-2008-248008 (page 3, paragraph [0004]).

However, the meshing of the color ink to the foundation layer differs according to the drying state of the foundation layer, and the image quality of the character, image, or the like deteriorates.

Here, the deterioration in image quality occurs due to degradation of coloring due to mixing of the color ink and the foundation layer, bleeding at the boundary within the color ink, and insufficient spread of color or the like due to the color ink being repelled.

SUMMARY

The invention can be realized in the following forms or application examples.

Application Example 1

According to the Application Example 1, there is provided an ink jet recording method, which performs recording on an ink non-absorbing recording medium, including recording a white image on the recording medium using white ink that contains a white pigment and does not contain an alkyl polyol where the boiling point corresponding to an atmospheric pressure of 1 is 280° C. or more in practice, drying the white image to a dryness factor of 40% to 80%, and recording a color image on the white image with a dryness factor of 40% to 80% using an ink jet method using the color ink where the surface tension is 30 mN/m or less and which contains a colorant and does not contain an alkyl polyol where the boiling point corresponding to an atmospheric pressure of 1 is 280° C. or more in practice.

According to the Application Example, since the white ink does not contain an alkyl polyol where the boiling point corresponding to an atmospheric pressure of 1 is 280° C. or more in practice, in the drying, drying easily progress when drying of the white image which is recorded using white ink in the recording of the white image is performed. Accordingly, compared to white ink which does contain an alkyl polyol where the boiling point corresponding to an atmospheric pressure of 1 is 280° C. or more in practice, it is easy to dry the white image to a dryness factor of 40% to 80% in a short time.

In the recording of the color image, with the white image with a dryness factor of 40% or more uses color ink which contains colorants, since drying has progressed, when the color image is recorded using the ink jet method using color ink that contains colorants, it is difficult for the white image and the color ink to mix compared to a case where the color image is recorded on a white image with a dryness factor of less than 40%. Accordingly, it is possible for an ink jet method to be obtained where deterioration in coloring due to the mixing of the white image and the color ink is suppressed, and deterioration in image quality is suppressed.

In addition, since color ink with surface tension of 30 mN/m or less is used, there is little repellence and it is possible to suppress deterioration in image quality due to repellence even on a white image where drying has not proceeded to the extent of the dryness factor of 40%.

In addition, even with a white image with approximately a dryness factor of 40%, it is possible to suppress deterioration in image quality due to repellence by lowering the surface tension of the color ink, and the range of the dryness factor of the white image which is able to be used is widened. Accordingly, it is possible to obtain an ink jet recording method where control of the dryness factor can be easily performed.

On the other hand, with a white image with a dryness factor of 80% or less, since drying does not proceed excessively, when the color image is recorded by the ink jet method using color ink that contains colorants, it is possible to suppress wetting and spreading of the color ink compared to a case where the color image is recorded on a white image with a dryness factor greater than 80%. Accordingly, it is possible to obtain an ink jet recording method where there is deterioration in image quality due to bleeding by mixing of color inks by the color inks spreading out on the white image.

In addition, since the color ink does not contain an alkyl polyol where the boiling point corresponding to an atmospheric pressure of 1 is 280° C. or more in practice, it is easy for the drying of the color ink to proceed and it is possible to suppress wetting and spreading of the color ink compared to a white ink which contains an alkyl polyol where the boiling point corresponding to an atmospheric pressure of 1 is 280° C. or more in practice. Accordingly, it is possible to obtain an ink jet recording method where deterioration in image quality due to bleeding due to mixing of color inks is suppressed.

Application Example 2

In the ink jet recording method according to Application Example 1, it is preferable that the amount of the white pigment which is contained in the white image which is recorded in the recording of the white image be equal to or more than $0.8$ g/m$^2$.

According to the Application Example, if the amount of the white pigment which is contained in the white image which is recorded in the recording of the white image is $0.8$ g/m$^2$ or more, the whiteness of the white image is 73.0 or more and it is possible to obtain an ink jet recording method where visibility of the color image is improved.

Application Example 3

In the ink jet recording method according to Application Example 1, it is preferable for one type or more which is selected from a group consisting of glycol ethers, polyether siloxane-based surfactants, and fluorinated surfactants to be contained in the color ink where an HLB value which is calculated using a Davies method is in the range of 4.2 to 8.0.

According to the Application Example, it is easy for wetting and spreading of ink to occur since any of glycol ethers, polyether siloxane-based surfactants, and fluorine-based surfactants are contained in the color ink where an HLB value which is calculated using a Davies method is in the range of 4.2 to 8.0.

Application Example 4

In the ink jet recording method according to Application Example 1, it is preferable that an ink jet method be used where the white image is recorded onto the recording medium using white ink in the recording of the white image, and the white pigment has an average particle diameter of 200 nm or more and 400 nm or less.

According to the Application Example, it is possible to obtain an ink jet recording method where whiteness of the white image is 73.0 or more if the white pigment has an average particle diameter of 200 nm or more and where it is possible to discharge white ink safely without retention in ink flow in the ink jet method if the average particle diameter is 400 nm or more.

In addition, since the same recording method which is the ink jet method is used in the recording of the white image and the recording of the color image, it is not necessary to change recording methods between the recording of the white image and the recording of the color image and process flow is improved. Accordingly, compared to the case where changing of recording methods is performed between the recording of the white image and the recording of the color image, it is possible to obtain an ink jet recording method where the recording time is short.

Application Example 5

In the ink jet recording method according to Application Example 1, it is preferable that the recording medium be one type selected from polyethylene terephthalate, polyethylene, polypropylene, metal and glass.

According to the Application Example, the recording material has ink non-absorbance since the recording medium is one type selected from polyethylene terephthalate, polyethylene, polypropylene, metal and glass.

Application Example 6

In the ink jet recording method according to Application Example 1, it is preferable that the recording medium be polyvinyl chloride, and the white ink contain one or more types of aprotic polar solvent selected from pyrrolidones, sulfoxides, imidazolidinones, and amide ethers.

According to the Application Example, in the case where the recording medium is polyvinyl chloride, since the white ink contains one or more types of aprotic polar solvent selected from pyrrolidones, sulfoxides, imidazolidinones, and amide ethers which are dissolved in polyvinyl chloride, it is possible to obtain an ink jet recording method where adherence of the recording medium and the white image is improved.

Application Example 7

In the ink jet recording method according to Application Example 1, it is preferable that at least one of the white ink or the color ink contain 50 mass % or more of water.

According to the Application Example, since at least one of the white ink or the color ink contain 50 mass % or more of water which has a smaller burden on the environment, it is possible to obtain an ink jet recording method which has a smaller effect on the environment.

Application Example 8

According to the Application Example 8, there is provided an ink jet recording apparatus where the ink jet recording method described above is used.

According to the Application Example, it is possible to obtain a recording apparatus which provides the results described above.

Application Example 9

According to the Application Example 9, a record is recorded using the ink jet recording method described above.

According to the Application Example, it is possible to obtain a record where the results described above are provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Below, embodiments will be described in detail based on the diagrams. Here, in each of the diagrams below, the dimensions of each of the layers and each of the members are different to the dimensions in practice in order for each of the layers and each of the members to be sizes to the extent of being recognizable.

Figure 1:
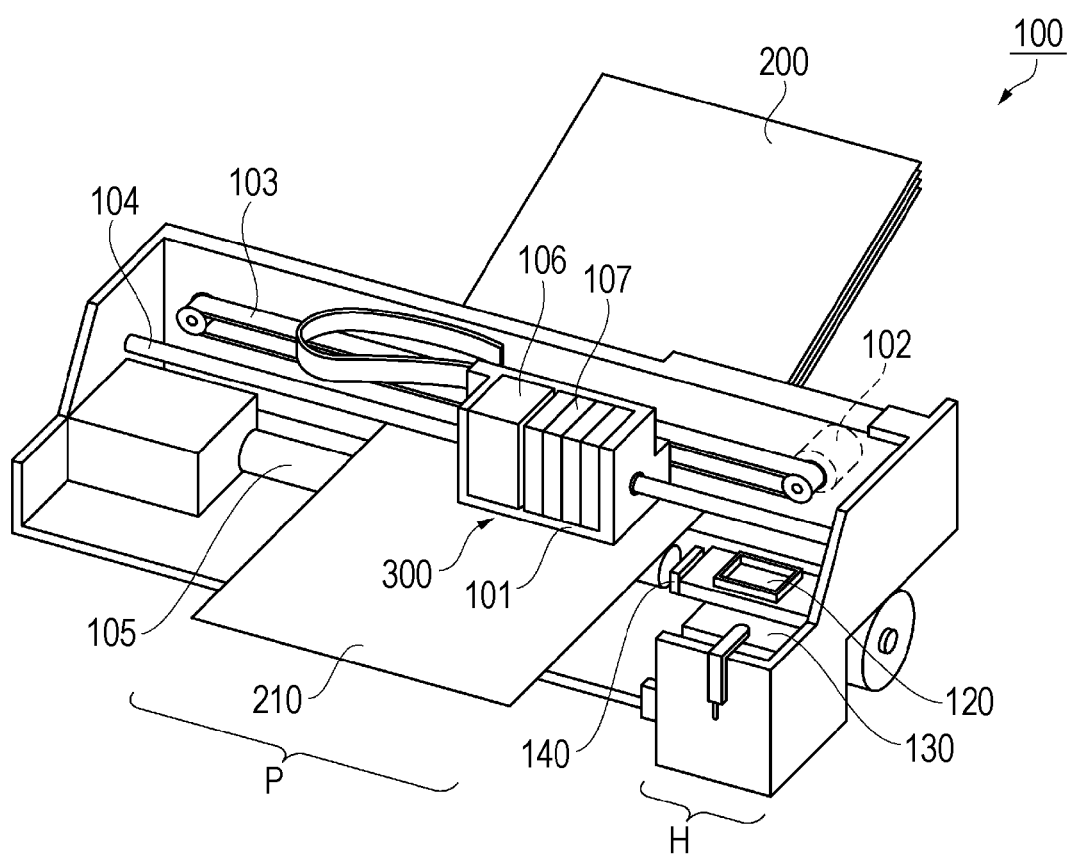
FIG. 1 is a schematic perspective view illustrating an ink jet recording apparatus.

FIG. 1 is a schematic perspective view illustrating an ink jet recording apparatus 100 as the recording apparatus in an embodiment.

In FIG. 1, the ink jet recording apparatus 100 is provided with a carriage 101. The carriage 101 reciprocates in a width direction of a platen 105 by being guided along a guiding member 104 via a timing belt 103 which is driven using a carriage motor 102.

A recording medium 200 is sent toward between the carriage 101 and the platen 105 using a transport mechanism which is not shown.

An ink jet recording head 300 is mounted in the carriage 101 in a position which opposes the recording medium 200.

In addition, a white ink cartridge 106 which supplies an ink as a liquid, and color and black ink cartridges 107 which supplies inks as color inks are mounted so as to be able to be attached to and detached from the ink jet recording head 300 in an upper portion of the ink jet recording head 300.

Ink is discharged using the ink jet recording head 300 and a character, an image, and the like are recorded on a recording medium 200 being disposed in a printing region P. The recording medium 200 where a character, an image, and the like are recorded is discharged as a record 210.

In addition, as shown in FIG. 1, in a nonprinting region where the recording medium 200 is not disposed, for example, in a home position H, there is a cleaning unit which has a capping member, a suction unit, and the like, for example, a capping unit 120, a suction pump 130, and a wiping member 140 are disposed.

The ink jet recording method in the embodiment includes a first recording process of recording a white image, a drying process of drying the white image, and a second recording process of recording a color image which is performed after the drying process.

First Recording Process

In the first recording process, the white image is recorded on the recording medium 200 using an ink jet method using white ink using the ink jet recording apparatus 100.

It is preferable that the recording medium 200 be one type selected from coated paper such as printing paper, polyethylene terephthalate, polyethylene, polypropylene, polyvinylchloride, metal and glass. The recording medium 200 has low ink absorbability or ink non-absorbability and the amount of water absorbed from the start of contact to 30 msec in the Bristow method is 1 ml/m$^2$ or less.

The white ink does not contain an alkyl polyol where the boiling point corresponding to an atmospheric pressure of 1 is 280° C. or more in practice. For example, propylene glycol where the boiling point corresponding to an atmospheric pressure of 1 is 188° C. or more may be contained, but glycerin where the boiling point corresponding to an atmospheric pressure of 1 is 280° C. or more, polyethylene glycol where the boiling point corresponding to an atmospheric pressure of 1 is 280° C. or more, polypropylene glycol where the boiling point corresponding to an atmospheric pressure of 1 is 280° C. or more, and the like are not contained.

In addition, the white ink contains a white pigment. As the white pigment, it is possible to use a pigment which contains fine particles of titanium oxide, zinc oxide, zirconium oxide, or hollow resin particles. Here, it is preferable that fine particles of titanium oxide be contained due to superior whiteness. The average particle diameter of the white pigment is not particularly limited but is preferably 100 nm or more and 1 µm or less, is more preferably 200 nm or more and 400 nm or less, is even more preferably 250 nm or more and 380 nm or less, and is most preferably 260 nm or more and 350 nm or less.

Here, the fine particles may be fine particles which are coated with silicon oxide, alumina, or the like.

The white image which is recorded in the first recording process may be a solid image which is formed on the recording medium 200 or a white image may be formed to match a position where a color image is formed using color and black ink. So as to obtain sufficient visibility of the color image which is recorded on the white image, the whiteness of the white image which is formed using the white ink is 73 or more and is preferably 75 or more.

Here, the amount of white pigment which is used in the recording of the white image is 0.8 g/m$^2$ or more and is more preferably 1.0 g/m$^2$ or more.

The surface tension of the white ink is not particularly limited in the invention but is preferably 30 mN/m or less and is more preferably 28 mN/m or less. Furthermore, it is preferable that the absolute values of differences in the surface tensions of the white ink which is the lower layer and the color ink which is the upper layer described later is 5 mN/m or less.

Drying Process

In the drying process, the white image is dried to a dryness factor of 40% to 80%. As the drying method, it is possible to use natural drying or heat drying. As heat drying, examples include warm air drying, direct-contact heater drying using a heat source, drying using active energy rays (for example, infrared rays), and the like.

It is sufficient if the dryness factor of 40% to 80% which is achieved in the drying process is achieved before the color ink which is discharged reaches the white image in the second recording process. Accordingly, the drying process is a process from the white image being recorded on the recording medium 200 in the first process to the color ink reaching the white image in the second recording process, and a natural drying process while the recording medium 200 where the white image is formed is being transported is included in the drying process. Here, the dryness factor is more preferably 50% to 80%.

Second Recording Process

In the second recording process, the color image is recorded using the color inks on the white image where the dryness factor is 40% to 80%. The white image where there is a large amount of the white pigment per unit area is in a state where wetting and spreading of the color ink is difficult. As such, in a case of an image which exhibits excellent whiteness, it is preferable to record the color image with the dryness factor described above.

It is possible for the color image to be formed using an ink jet method using the color ink.

The color ink has a surface tension of 30 mN/m or less, contains a colorant, and does not contain an alkyl polyol where the boiling point corresponding to an atmospheric pressure of 1 is 280° C. or more in practice.

Here, the surface tension of the color ink is preferably 28 mN/m or less and is more preferably 26 mN/m or less.

Other Additives in White Ink and Color Ink

At least one of the white ink or the color ink may contain one type or more which is selected from a group consisting of a glycol ether, a polyether siloxane-based surfactant, and a fluorine-based surfactant where an HLB (Hydrophile Lipophile Balance) value which is calculated using a Davies method is in the range of 4.2 to 8.0. Due to the additive being contained, the surface tension is reduced and wetting is improved with regard to the recording medium 200.

Glycol Ether

It is possible to control the wetting and the penetration speed with there hardly being any effect due to the type of the recording medium 200 by at least one of the white ink or the color ink containing the glycol ethers which satisfies the HLB range described above. Due to this, it is possible to record a clear image with few shading irregularities with regard to the recording medium 200, in particular, the recording medium 200 with ink non-absorbability or low absorbability.

Here, the HLB value of the glycol ethers which is used in the embodiment is a value which evaluates the hydrophilicity of a compound which was proposed by Davies et al., and for example, refers to a value which is a numerical value which is determined using the Davies method which is defined in the literature "J. T. Davies and E. K. Rideal, "Interface Phenomena" 2nd ed. Academic Press, New York 1963" and is calculated using the following equation.

$$\text{HLB value} = 7 + \Sigma[1] + \Sigma[2]$$

(Here, [1] represents the number of groups which are hydrophilic groups and [2] represents the number of groups which are hydrophobic groups.)

The structure and number of groups of representative hydrophilic groups and hydrophobic groups are exemplified in Table 1 below.

TABLE 1

| Structure | Number of groups |
|---|---|
| —CH$_2$— | −0.475 |
| —CH$_3$ | −0.475 |
| —(CH$_2$CH$_2$O)— | +0.330 |

TABLE 1-continued

| Structure | Number of groups |
|---|---|
| —(CHCH$_2$O)—<br>    \|<br>  CH$_3$ | −0.150 |
| —OH | +1.900 |

The HLB value of the glycol ethers which is calculated using the Davies method is preferably in the range of 4.2 to 8.0, is more preferably in the range of 5.0 to 7.8, is even more preferably in the range of 5.0 to 7.1, and is most preferably in the range of 5.8 to 7.1.

The hydrophobicity of the glycol ethers where the HLB value is less than 4.2 increases and there are cases where the storage stability of the ink is deteriorated due to the affinity with water being reduced in a case where the main solvent is water.

On the other hand, when the HLB value is larger than 8.0, the effect of the wetting and the penetration with regard to the recording medium 200 is reduced and there are cases where shading irregularities are conspicuous in the image. In particular, there is a tendency for the effect of wetting with regard to the recording medium 200 with ink non-absorbability or low absorbability which is a hydrophobic surface to be remarkably reduced.

Specific examples of such a glycol ethers include an ethylene glycol mono-isobutyl ether, an ethylene glycol mono-hexyl ether, an ethylene glycol mono-isohexyl ether, a diethylene glycol mono-hexyl ether, a triethylene glycol mono-hexyl ether, a diethylene glycol mono-isohexyl ether, a triethylene glycol mono-isohexyl ether, an ethylene glycol mono-isoheptyl ether, a diethylene glycol mono-isoheptyl ether, a triethylene glycol mono-isoheptyl ether, an ethylene glycol mono-octyl ether, an ethylene glycol mono-isooctyl ether, a diethylene glycol mono-isooctyl ether, a triethylene glycol mono-isooctyl ether, an ethylene glycol mono-2-ethylhexyl ether, a diethylene glycol mono-2-ethylhexyl ether, a triethylene glycol mono-2-ethylhexyl ether, a diethylene glycol mono-2-ethyl pentyl ether, an ethylene glycol mono-2-ethyl pentyl ether, an ethylene glycol mono-2-methyl pentyl ether, a diethylene glycol mono-2-methyl pentyl ether, a propylene glycol monobutyl ether, a dipropylene glycol monomethyl ether, a triethylene glycol monomethyl ether, a propylene glycol mono-propyl ether, a dipropylene glycol mono-propyl ether, a tripropylene glycol monomethyl ether, and the like. It is possible to the glycol ether to be used as one type singly or two or more types in combination.

Out of the glycol ethers which have been exemplified, it is preferable for an alkyl group which is included in the glycol ethers to have a branch structure. Due to the inclusion of the glycol ether where the alkyl group has a branch structure, it is possible to record a clear image with few shading irregularities with regard to the recording medium 200, in particular, the recording medium 200 with ink non-absorbability or low absorbability. Specific examples include an ethylene glycol mono-isobutyl ether, an ethylene glycol mono-isohexyl ether, a diethylene glycol mono-isohexyl ether, a triethylene glycol mono-isohexyl ether, an ethylene glycol mono-isoheptyl ether, a diethylene glycol mono-isoheptyl ether, a triethylene glycol mono-isoheptyl ether, an ethylene glycol mono-isooctyl ether, a diethylene glycol mono-isooctyl ether, a triethylene glycol mono-isooctyl ether, an ethylene glycol mono-2-ethylhexyl ether, a diethylene glycol mono-2-ethylhexyl ether, a triethylene glycol mono-2-ethylhexyl ether, a diethylene glycol mono-2-ethyl pentyl ether, an ethylene glycol mono-2-ethyl pentyl ether, an ethylene glycol mono-2-methyl pentyl ether, a diethylene glycol mono-2-methyl pentyl ether, and the like.

Out of the branched structures which are included in the glycol ethers, from the point of view of further increasing the coloring, a 2-methyl pentyl group, a 2-ethyl pentyl group, and a 2-ethyl hexyl group are more preferable and a 2-ethyl hexyl group is particularly preferable. Specific examples include an ethylene glycol mono-2-ethylhexyl ether, a diethylene glycol mono-2-ethylhexyl ether, a triethylene glycol mono-2-ethylhexyl ether, a diethylene glycol mono-2-ethyl pentyl ether, an ethylene glycol mono-2-ethyl pentyl ether, an ethylene glycol mono-2-methyl pentyl ether, a diethylene glycol mono-2-methyl-pentyl ether and the like, and an ethylene glycol mono-2-ethylhexyl ether, a diethylene glycol mono-2-ethylhexyl ether, and a triethylene glycol mono-2-ethylhexyl ether are preferable.

The content of the glycol ethers is preferably in the range of 0.05 mass % or more and 6 mass % or less with regard to the total amount of the ink composition from the point of view of the effect of reducing shading irregularities by improving the wetting and penetration with regard to the recording medium 200 and of securing ink storage stability and discharge reliability.

When the content of the glycol ethers is less than 0.05 mass %, there are cases where the wetting, the penetration, and the drying of the ink composition are poor, it is difficult to obtain a clear image, and in addition, the concentration (coloring) of the printing is insufficient. In addition, when the content of the glycol ethers is larger than 6 mass %, there are cases where viscosity of the ink is high and clogging of the heads occurs, and it is not possible to obtain storage stability due to the glycol ethers not being completely dissolved in the ink composition. The glycol ethers of poor water solubility is effective, and the content thereof is preferably in the range of 0.1 mass % or more and 2 mass % or less with regard to the total amount of the ink composition.

Polyether Siloxane-Based Surfactant

At least any of the white ink or the color ink preferably contains a polyether siloxane-based surfactant. As a preferable surfactant, it is possible to use the surfactant shown in formula (1) below.

In formula (1), $R^1$ to $R^7$ independently represent an alkyl group with 1 to 6 carbon atoms, preferably, a methyl group. j and k independently represent an integer of 1 or more, but preferably 1 to 5, more preferably 1 to 4, even more preferably 1 or 2 and the satisfying either of j=k=1 or k=j+1 is preferable. In addition, g represents an integer of 0 or more, preferably 1 to 3, and most preferably 1. Furthermore, p and q each represent integers of 0 or more and preferably represent 1 to 5. However, p+q is an integer of 1 or more and p+q is preferably 2 or more and 4 or less.

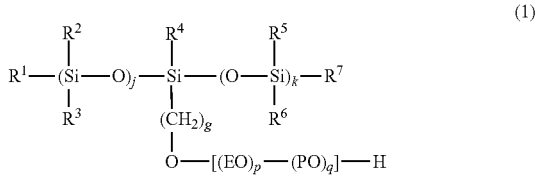

(1)

The format where the polyether siloxane-based surfactant is most preferable as the compound with the formula (1), $R^1$ to $R^7$ all represent methyl groups, j represents 1 or 2, k represents 1 or 2, g represents 1 or 2, p represents an integer of 1 or more and 5 or less, and q represents 0.

The additive content of the polyether siloxane-based surfactant is appropriately determined, but is preferably 0.03 mass % to 3 mass %, is more preferably approximately 0.1 mass % or more and 2 mass % or less, and is more preferably approximately 0.2 mass % or more and 1 mass % or less. When 0.2 mass % or more and 1 mass % or less, the coating on a medium which is easy to repel an ink is excellent due to the combination with the glycol ethers described above.

The polyether siloxane-based surfactant is not particularly limited, but in a case of an aqueous solution which contains 20 mass % of glycerin, 10 mass % of 1,2-hexanediol, 0.1 mass % of polyether siloxane-based surfactant, and 69.9 mass % of water, it is preferable to use a surfactant where the dynamic surface tension of the aqueous solution at 1 Hz is 26 mN/m or less. For example, it is possible to measure the surface tension using a dynamic surface tension bubble pressure gauge BP2 (manufactured by KRUS).

A surfactant which is commercially available and is able to be commercially obtained may be used as the polyether siloxane-based surfactant, and for example, it is possible to use Olfine PD-501 (Nissin Chemical Industry Co., Ltd.) Olfine PD-570 (Nissin Chemical Industry Co., Ltd.), BYK-347 (BYK Co., Ltd.), BYK-348 (BYK Co., Ltd.), and the like.

In addition, it is possible to use the surfactant shown by formula (2) as the polyether siloxane-based surfactant.

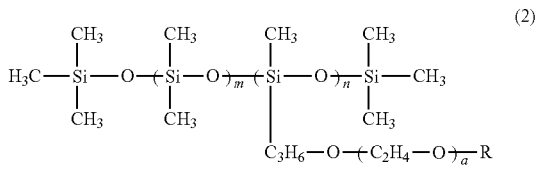

(2)

It is preferable that one type or two or more types of a compound which is represented by (in the formula, R represents a hydrogen atom or a methyl group, a represents an integer of 7 to 11, m represents an integer of 30 to 50, and n represents an integer of 3 to 5.) be contained or that one type or two or more types of a compound where R represents a hydrogen atom or a methyl group, a represents an integer of 9 to 13, m represents an integer of 2 to 4, and n represents an integer of 1 or 2 in the formula (2) be contained. In addition, it is more preferable that one type or two or more types of a compound where R represents a hydrogen atom or a methyl group, a represents an integer of 6 to 18, m represents an integer of 0, and n represents an integer of 1 in the formula (2) be contained. Furthermore, it is even more preferable that one type or two or more types of a compound where R represents a hydrogen atom, a represents an integer of 2 to 5, m represents an integer of 20 to 40, and n represents an integer of 3 to 5 in the formula (2) be contained.

Due to such a specific polyether siloxane-based surfactant being used, the beading and bleeding of ink is further improved even in a case of being printed on an ink non-absorbability recording medium as the recording medium 200.

It is possible to further improve the beading of the ink by using the compound where R in the compound of the formula (2) is a methyl group. In addition, it is possible to further improve the bleeding of the ink by using in combination with the compound where R in the compound of the formula (2) is a hydrogen atom. The surfactant where R is a methyl group is contained to be preferably 0.01 mass % to 1.0 mass % and to be more preferably 0.05 mass % to 0.70 mass %.

Due to the arrangement proportions of the compound where R is a methyl group and the compound where R is a hydrogen group in the compound of the formula (2) being appropriately adjusted, furthermore, it is possible to realize a high-quality image where there is no bleeding or beading, and in addition, this is effective as an adjusting agent in a case where the fluidity is different due to the type of pigment or the amount of resin.

Fluorine-Based Surfactant

In addition, a fluorine-based surfactant may be used in the white ink and the color ink. The fluorine-based surfactant is as disclosed in International Publication No. WO2010/050618 and International Publication No. WO2011/007888, is known as a solvent which contributes to excellent wetting with regard to the recording medium 200 with ink non-absorbability or low absorbability, and it is able to be appropriately used in the invention in combination with the glycol ethers and the polyether siloxane-based surfactants described above.

The fluorine-based surfactant is not particularly limited, but is able to be appropriately selected according to the purpose, and for example, examples include a perfluoroalkyl sulfonic acid salt, a perfluoroalkyl carboxylic acid salt, a perfluoroalkyl phosphoric acid ester, a perfluoroalkyl ethylene oxide adduct, a perfluoroalkyl betaine, a perfluoroalkyl amine oxide compound, and the like. Out of these, the compounds which are represented by the general formulae (3) to (8) are particularly preferable from the point of view of reliability and the compounds which are represented by the formulae (3), (4), (5), and (8) are even more preferable.

(3)

Here, in the formula (3), m represents an integer of 0 to 10 and n represents an integer of 0 to 40.

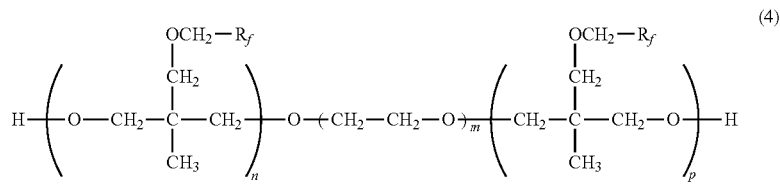

(4)

Here, in the formula (4), Rf represents a fluorine-containing group and examples thereof include $CF_3$, $CF_2CF_3$, and the like. m, n and p each represent integers, m represents an integer of 6 to 25, n represents an integer of 1 to 4, and p represents an integer of 1 to 4.

(5)

Here, in the formula (5), $M^+$ represents any of $Li^+$, $Na^+$, $K^+$, and $NH_4^+$.

$$[(R_fSO_2)_2]N^-M^+ \quad (6)$$

Here, in the formula (6), $R_f$ represents any of $CF_3$, $C_2F_5$, $C_3F_7$, $C_4F_9$, and $M^+$ represents any of $Li^+$, $Na^+$, $K^+$, and $NH_4^+$.

$$[(R_fSO_2)(RSO_2)]N^-M^+ \quad (7)$$

Here, in the formula (7), $R_f$ represents any of $CF_3$, $C_2F_5$, $C_3F_7$, $C_4F_9$, R represents an alkyl group with 1 to 10 carbon atoms, and $M^+$ represents any of $Li^+$, $Na^+$, $K^+$, and $NH_4^+$.

$$[(FSO_2)_2]N^-M^+ \quad (8)$$

Here, in the formula (8), $M^+$ represents any of $Li^+$, $Na^+$, $K^+$, and $NH_4^+$.

As the fluorine-based surfactant, an appropriate synthesis may be used and a commercially available product may be used. Examples of the commercially available product include S•144 and S•145 (manufactured by Asahi Glass Co., Ltd.); FC•170C, FC•430, and Fluorad•FC4430 (manufactured by Sumitomo 3M Ltd.); FSO, FS•100, FSN, FSN•100, and FS•300 (manufactured by Dupont); FT•250 and 251 (manufactured by Neos Co., Ltd.), and the like. Out of these, FSO, FS•100, FSN, FSN•100, and FS•300 manufactured by Dupont are preferable in being able to provide excellent printing quality and storage. The surfactant which is a nonionic fluorine-based surfactant may be used as one type singly or may be used as two or more types in combination.

In a case where the recording medium 200 is polyvinyl chloride, it is preferable for the white ink to include an aprotic polar solvent which is one type or more selected from a pyrrolidone, a sulfoxide, an imidazolidinone, and an amide ether. As a representative example of a pyrrolidone, there are 2-pyrrolidone, N-methyl-2-pyrrolidone, and N-ethyl-2-pyrrolidone, as a representative example of a sulfoxide, there is dimethyl sulfoxide, and as a representative example of an imidazolidinone, there is 1,3-dimethyl-2-imidazolidinone.

In addition, the amide ether corresponds to the solvent which is shown in the general formula (9).

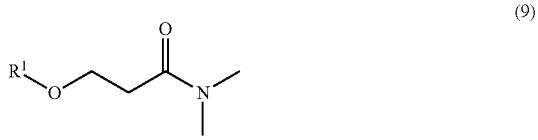

(9)

In the formula (9), $R^1$ is appropriately an alkyl group with 1 to 4 carbon atoms. It is possible for the "alkyl group with 1 to 4 carbon atoms" to be a linear or branched alkyl group, and for example, a methyl group, an ethyl group, a n-propyl group, an iso-propyl group, a n-butyl group, an iso-butyl group, a sec-butyl group, and a tert-butyl group are possible.

The solvent which is shown by the formula (9) where $R^1$ is an alkyl group with 1 to 4 carbon atoms is able to impart appropriate pseudoplasticity to the ink composition and it is possible to secure excellent discharge stability of the ink due to this. Since the solvent which is shown by the formula (9) where $R^1$ is an alkyl group with 1 to 4 carbon atoms interacts with the polyvinyl chloride-based resin, it is possible to strongly fix the ink to the surface of the recording medium 200 which contains a polyvinyl chloride-based resin.

The HLB value of the solvent which is shown by the formula (9) is 10.5 or more and 20.0 or less and is preferably 12.0 or more and 18.5 or less. When the HLB value of the solvent which is shown by the formula (9) is in the range described above, it is more appropriate from the point of being able to impart appropriate pseudoplasticity to the ink and the point of interaction with the polyvinyl chloride-based resin.

Here, the HLB value of the solvent which is shown by the formula (9) is a value which is calculated using the following equation from a ratio of the nonpolar value (I) and the organic value (O) in the organic concept diagram (referred to below simply as an "I/O value").

HLB value=(nonpolar value(I)/organic value(O))×10

Specifically, the I/O value is able to be calculated based on each of the literature of "Systematic Organic Qualitative Analysis, Edition on Mixtures" by Atsushi Fujita, Kazama Shobo, 1974; "Dyeing Theoretical Chemistry", by Nobuhiko Kuroki, Maki Publishing, 1966; and "Separation Methods of Organic Compounds", by Hiroo Inoue, Shokabo, 1990.

A surfactant other than the polyether siloxane-based surfactant and the fluorine-based surfactant described above may be used. That is, an anionic surfactant (for example, a sodium dodecyl benzene sulfonate salt, a sodium lauryl phosphate salt, a polyoxyethylene alkyl ether sulfate ammonium salt, and the like) and a nonionic surfactant (for example, a polyoxyethylene alkyl ether, a polyoxyethylene alkyl ester, a polyoxyethylene sorbitan fatty acid ester, and a polyoxyethylene alkyl phenyl ether) may be used.

The white ink composition and the color ink composition may contain an alkane diol. As the alkane diol, other than 1,2-alkyl diol, it is possible to use a both-ends diol such as 1,4-butanediol, 1,5-pentanediol, 1,6-hexanediol, and 1,7-heptanediol and a diol with a branch structure such as 3-methyl-1,3-butanediol, 2-ethyl-1,3-hexanediol, 2-methyl-1,3-propanediol, 2,4-dimethyl-1,5-pentanediol, and 3-(2-methoxyphenoxy)-1-2-propanediol. Out of these, a 1,2-alkanediol with 4 to 8 carbon atoms such as 1,2-butanediol, 1,2-pentanediol, 1,2-hexanediol, 1,2-heptanediol, and 1,2-octanediol. Out of these, 1,2-hexanediol, 1,2-heptanediol, and 1,2-octanediol with 6 to 8 carbon atoms are more preferable since penetration into the recording medium 200 is particularly high.

Other than this, for example, an alkyl alcohol such as ethanol, methanol, butanol, propanol, and isopropanol, formamide, acetamide, dimethyl sulfoxide, sorbitol, sorbitan, acetin, diacetin, triacetin, sulfolane, dipropylene glycol, ethylene glycol, propylene glycol, trimethylol propane, and the like may be contained.

As described above, according to the ink jet recording method according to the embodiment, it is possible to obtain the following effects.

(1) Since the white ink does not contain an alkyl polyol where the boiling point corresponding to an atmospheric pressure of 1 is 280° C. or more in practice, in the drying process, drying easily progress when drying of the white image which is recorded using white ink in the first recording process is performed. Accordingly, compared to white ink which does contain an alkyl polyol where the boiling point corresponding to an atmospheric pressure of 1 is 280° C. or more in practice, it is easy to dry the white image to a dryness factor of 40% to 80% in a short time.

In the second recording process, with the white image with a dryness factor of 40% or more, since drying has progressed, when the color image is recorded using the ink jet method using the color ink that contains the colorants, it is difficult for the white image and the color ink to mix compared to a case where the color image is recorded on a white image with a dryness factor of less than 40%. Accordingly, it is possible for an ink jet method to be obtained where it is possible to suppress deterioration in coloring due to the mixing of the white image and the color ink and deterioration in image quality is suppressed.

On the other hand, when the dryness factor exceeds 80%, there is a concern that the color ink on the white image does not excellently penetrate (is repelled) and the color inks may be mixed on the white image.

The dryness factor in the drying process described above is calculated as follows. That is, the weight of the recording medium in a case where the image is formed by imparting the white ink onto the recording medium 200 corresponds to a dryness factor of 0%. Then, the point in time where the image is dried to be the predetermined drying conditions and the change in the weight of the recording medium 200 has stopped in practice corresponds to a dryness factor of 100%. From both sets of data and data which is obtained as the drying time changes (intermediate dryness factor), it is possible to represent the change in the weight of the recording medium 200 over time and the change in the dryness factor over time under the same drying conditions. The dryness factor is able to be calculated from the results which are obtained and the time from the forming of the white image to the forming of the color image. Here, in a case where the drying temperature of the image which is recorded on the recording medium changes over time, the dryness factor is calculated from the weight of the recording medium when recording is performed.

In addition, even with the white image with a dryness factor of approximately 40%, it is possible to suppress deterioration in image quality due to repellence by lowering the surface tension of the color ink, and the range of the dryness factor of the white image which is able to be used is widened. Accordingly, it is possible for an ink jet method to be obtained where control of the dryness factor is be easily performed.

On the other hand, with the white image with a dryness factor of 80% or less, since drying does not proceed excessively, when the color image is recorded by the ink jet method using the color ink that contains colorants, it is possible to suppress wetting and spreading of the color ink compared to a case where the color image is recorded on the white image with a dryness rate greater than 80%. Accordingly, it is possible for an ink jet recording method to be obtained which suppresses deterioration in image quality due to bleeding due to mixing of color inks by the color inks spreading out on the white image.

In addition, since the color ink does not contain an alkyl polyol where the boiling point corresponding to an atmospheric pressure of 1 is 280° C. or more in practice, it is easy for the drying of the color ink to proceed and it is possible to suppress wetting and spreading of the color ink compared to a white ink which contains an alkyl polyol where the boiling point corresponding to an atmospheric pressure of 1 is 280° C. or more in practice. Accordingly, it is possible to obtain an ink jet recording method which suppresses deterioration in image quality due to bleeding where mixing of color inks occurs.

(2) If the amount of the white pigment which is contained in the white image which is recorded in the first recording process is 0.8 g/m$^2$ or more, it is possible that the whiteness of the white image is 73.0 or more and it is possible to obtain an ink jet recording method where visibility of the color image is improved.

(3) It is possible for it to be easy for wetting and spreading of ink to occur since any of a glycol ether, a polyether siloxane-based surfactant, and a fluorine-based surfactant are contained in the white ink or the color ink where an HLB value which is calculated using a Davies method is in the range of 4.2 to 8.0.

(4) It is possible to obtain an ink jet recording method where it is possible for whiteness of the white image to be 73.0 or more if the white pigment has an average particle diameter of 200 nm or more and where it is possible to discharge the white ink safely without retention in ink flow occurring in the ink jet method if the average particle diameter is 400 nm or more.

In addition, since the same recording method which is the ink jet method is used in the first recording process and the second recording process, it is not necessary to change of the recording method between the first recording process and the second recording process and it is possible for the process flow to be improved. Accordingly, compared to the case where a change of the recording method is performed between the first recording process and the second recording process, it is possible to obtain an ink jet recording method where the recording time is short.

(5) Since the recording medium 200 is one type selected from polyethylene terephthalate, polyethylene, polypropylene, metal and glass, the recording medium 200 has ink non-absorbance.

(6) In the case where the recording medium 200 is polyvinyl chloride, since the white ink contains an aprotic polar solvent which is one or more types selected from pyrrolidones, sulfoxides, imidazolidinones, and amide ethers which are dissolved in polyvinyl chloride, it is possible to obtain an ink jet recording method where adherence of the recording medium and the white image is improved.

(7) Since at least one of the white ink or the color ink contain 50 mass % or more of water which has a smaller burden on the environment, it is possible to obtain an ink jet recording method which has a smaller effect on the environment. In addition, it is preferable that both the white ink and the color ink include 50 mass % or more of water.

(8) It is possible to obtain the ink jet recording apparatus 100 where the effects described above are provided.

(9) It is possible to obtain a record 210 where the effects described above are provided.

EXAMPLES

Below, the embodiment will be described in detail using examples and the like.

The white images in the examples and the comparative examples were formed using the following method.

First Recording Process

In the first recording process, a composition which is shown in Table 2 was used as the white ink. In Table 2, the surface tension is also shown. The units of the composition are mass % concentrations and the units of the surface tension are mN/m.

TABLE 2

| | |
|---|---|
| 2-pyrrolidone | 2 |
| 1,2-hexanediol | 5 |
| propylene glycol | 15 |
| BYK-348 | 0.5 |
| VINYBLAN (solid content) | 5 |
| Titanium dioxide | 10 |
| Styrene acrylic resin | 3 |
| Residual is water | |
| Surface tension | 25.4 |

BYK-348 which is manufactured by BYK Co., Ltd. was used as the polyether siloxane-based surfactant which is represented by the formula (1) and VINYBLAN 700 was used as VINYBLAN, which is manufactured by Nissin Chemical Industry Co., Ltd.

Other than this, it is possible to use commercially available products and is able to be commercially obtained for 2-pyrrolidone, 1,2-hexanediol, propylene glycol, titanium dioxide, styrene acrylic resin, and distilled water.

As the ink jet recording apparatus 100, Colorio (registered trademark) PX-G930 which is manufactured by Seiko Epson Corporation and Lumirror (registered trademark) which is manufactured by Toray Industries Inc. which is a polyester film as the recording medium 200 were used. Then, a solid image was formed as the white image using the white ink which is the composition which is shown in Table 1.

Here, the dispersion solution of titanium dioxide which is used in the white ink was manufactured using the following method.

A polymer dispersion solution with a resin solid content of 25 mass % was obtained by 25 mass parts of solid acrylic acid/n-butyl acrylate/benzyl methacrylate/styrene copolymer with a glass transition temperature of 40° C., a weight average molecule weight of 10,000, and an acid value of 150 mgKOH/g being dissolved in a mixed solution of 75 mass parts of diethylene glycol diethyl ether.

To 36 mass % of the polymer dispersion solution, 19 mass % of diethylene glycol diethyl ether was added and mixed, a resin varnish for dispersing titanium dioxide was prepared, grinding was performed using a wet circulation mill after stirring and mixing after adding 45 mass % of titanium dioxide (CR-90, processed with silica alumina (alumina/silica 0.5), volumetric reference of the average particle diameter of 300 nm, oil absorption of 21 ml/100 g, manufactured by Ishihara Sangyo Kaisha, Ltd.), and a titanium dioxide dispersion was obtained.

The result of measuring the whiteness (L*) by changing the discharge amount of the white ink (g/m$^2$) and changing the amount of the white pigment (g/m$^2$) which is coated, is shown in Table 3.

TABLE 3

| Ink Discharge Amount (g/m$^2$) | Coating Pigment Amount (g/m$^2$) | Whiteness (L*) |
|---|---|---|
| 3.6 | 0.36 | 66.4 |
| 5.4 | 0.54 | 70.1 |
| 7.2 | 0.72 | 72.4 |
| 8.7 | 0.87 | 73.7 |
| 10.5 | 1.05 | 75.1 |
| 12.6 | 1.26 | 76.3 |
| 14.4 | 1.44 | 77.3 |
| 16.2 | 1.62 | 78.1 |
| 18 | 1.8 | 78.8 |

It is possible to confirm that the whiteness of the white image is 73.0 or more and visibility improves if the amount of the white pigment is 0.8 g/m$^2$ or more from the results shown in Table 3.

Figure 2:
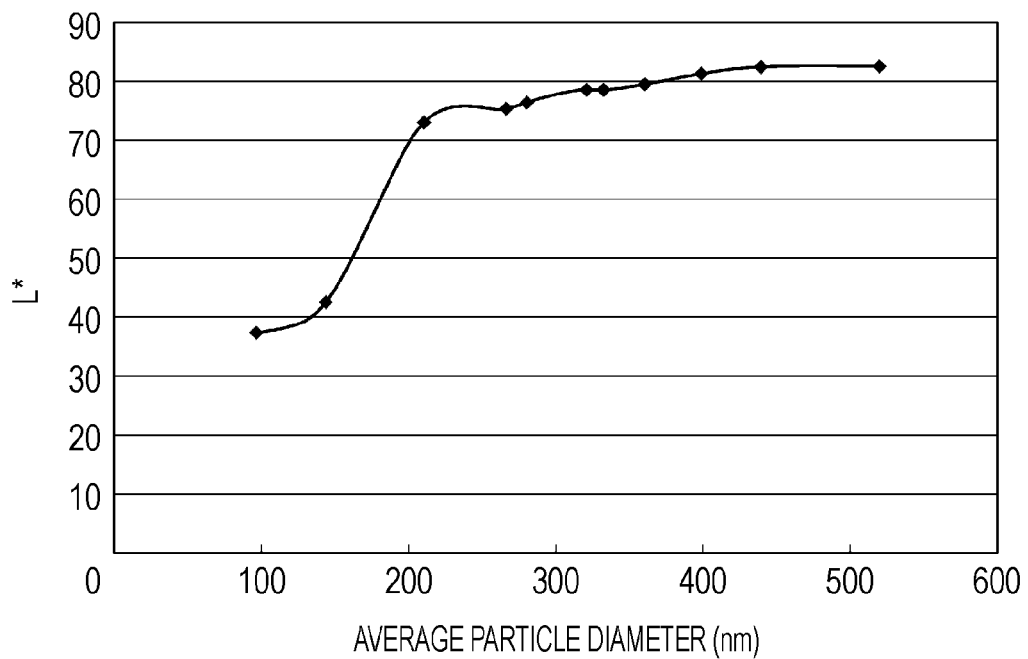
FIG. 2 is a view illustrating results where whiteness and discharge stability are evaluated by changing the average particle diameter of titanium dioxide.

In addition, Table 4 and FIG. 2 are a table and a diagram which show the results where the whiteness (L*) and the discharge stability have been evaluated by changing the average particle diameter of titanium dioxide as the white pigment which is included in the white ink.

TABLE 4

| Particle Diameter MV | L* | Discharge Stability |
|---|---|---|
| 96 | 37.5 | ◯ |
| 144 | 42.3 | ◯ |
| 210 | 73.1 | ◯ |
| 266 | 75.3 | ◯ |
| 280 | 76.4 | ◯ |
| 321 | 78.5 | ◯ |
| 332 | 78.8 | ◯ |
| 360 | 79.5 | ◯ |
| 399 | 81.3 | ◯ |
| 440 | 82.1 | X |
| 520 | 82.4 | X |

It is possible to confirm that whiteness of the white image of 73.0 or more is possible to obtain if the white pigment has an average particle diameter of 200 nm or more and it is possible to discharge white ink safely without retention in ink flow occurring in the ink jet method if the average particle diameter is 400 nm or less using the results shown in Table 4 and FIG. 2.

Drying Process

Figure 3:
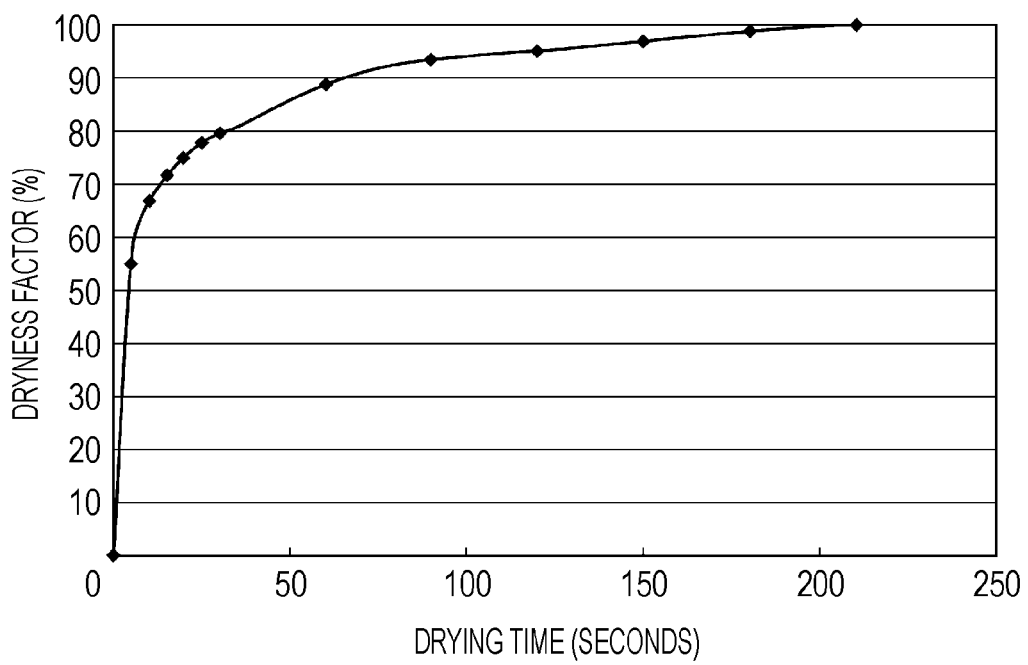
FIG. 3 is a view illustrating a relationship between drying time and dryness factor.

FIG. 3 is a view of an example illustrating a relationship between drying time and dryness factor of the white image in the drying process.

The measurement of the dryness factor was performed by measuring the weight by heating the white image to 50° C. after forming the white image in an environment of room temperature of 25° C. and humidity of 30%. The dryness factor is calculated with a state where the evaporating components are not present in practice and changes in the weight have stopped is set as a dryness factor of 100%.

For example, in a case where the white image is dried by heating on the platen 105 in the ink jet recording apparatus 100, the white image is held on the platen 105 for 4.5 seconds in order to obtain a dryness factor of 40% and the white image is held on the platen 105 for 30.0 seconds in order to obtain a dryness factor of 80%. After being held, the second recording process is performed before the drying factor does not change. Here, when natural drying occurs up until the second recording process by the transportation of the recording medium 200 where the white image is formed from the platen 105, the drying on the platen is performed in consideration of the dryness factor due to natural drying and the dryness factor of the white image is adjusted to be 40% to 80% when the color ink reaches the white image.

Second Recording Process

In the second recording process, the color image was formed on the white image which is formed on a polyester film and a vinyl chloride film using a cyan ink which is a color ink in the six types where the composition is changed. Here, the image quality was evaluated by the dryness factor of the white image being changed.

In the polyester film, Lumirror 100S10 which is manufactured by Toray Industries Inc. was used, and in the vinyl chloride film, a polyvinyl chloride film (PVC) LLSP EX113 which is manufactured by Sakurai Co., Ltd. was used.

Compositions of cyan inks B, C, E, F, and G as examples and cyan inks A and D as comparative examples are described in Table 5. Then, the surfactants which were used in each of the cyan inks, the surface tensions, the types of the recording media 200 which were used, and the dryness factors of the corresponding white images are shown in Table 6. It is possible to use a commercially available product and is able to be commercially obtained as EHDG (diethylene glycol mono-2-ethylhexyl ether). Here, Olfine E1010 is an acetylene-based surfactant which is manufactured by Nissin Chemical Industry Co., Ltd. In addition, the dispersion of the cyan inks were performed using the following method.

A cyan pigment was dispersed using the following method. Into a mixed solution of 7 parts of potassium hydroxide, 23 parts of water, and 30 parts of triethylene glycol-mono-n-butyl ether, 40 parts of water soluble resin (a copolymer of methacrylic acid/butyl acrylate/styrene/hydroxyethyl acrylate with a molar ratio of 25/50/15/10. Weight average molecular weight of 12,000) was inserted and dissolved, a polymerization reaction was performed by heating at 80° C. and mixing, and a polymer dispersing agent varnish was manufactured. To 1.75 kg of the solution (solid content of 43%) 3.0 kg of pigment blue 15:3, 1.5 kg of ethylene glycol, and 8.75 kg of water were mixed, and premixing was performed by mixing using a mixture mixing unit. Dispersion of a pigment mixture solution was performed using a multi-pass method with a horizontal type of beads mill which is provided with a multi-disk type impeller with an effective volume of 1.5 liters where 85% thereof is filled with 0.5 mm zirconia beads. Specifically, two passes were performed with a discharge amount of 30 liters in one hour with a beads circumferential speed of 8 m/sec and a pigment mixture solution was obtained. Next, circulation dispersion was performed with a horizontal annular type of beads mill which is provided with a multi-disk type impeller with an effective volume of 1.5 liters where 95% thereof is filled with 0.05 mm zirconia beads. A screen of 0.015 mm was used and a dispersion process was performed with a circulation amount of 300 liters/hour with a beads circumferential speed of 10 m/sec for four hours for 10 kg of the pigment dispersion mixture solution having, and a pigment dispersion solution with a pigment solid content of 20% was obtained.

In the example, the surface tension uses a surface tension gauge CBVP-Z (manufactured by Kyowa Interface Science Co., Ltd.).

In addition, the image quality was evaluated with ○ in a case where there are no deterioration in coloring, bleeding at the interface with the color ink, insufficiencies in the spreading of color due to repellence of the color ink, and the like, x in a case where the image quality is deteriorated due to the above occurring, and with Δ between ○ and x, and are shown along with the dryness factor of the white image in Table 6.

TABLE 5

|  | A | B | C | D | E | F | G |
|---|---|---|---|---|---|---|---|
| 2-pyrrolidone | 2 | 2 | 2 | 8 | 8 | 8 | 2 |
| 1,2-hexanediol | 5 | 5 | 5 | 5 | 5 | 5 | 5 |
| propylene glycol | 15 | 15 | 15 | 10 | 10 | 10 | 15 |
| E1010 | 0.5 | 0 | 0 | 0.5 | 0 | 0 | 0 |
| BYK-348 | 0 | 0.05 | 0.5 | 0 | 0.05 | 0.5 | 0 |
| PD570 | 0 | 0 | 0 | 0 | 0 | 0 | 0.5 |
| EHDG | 0 | 0 | 0 | 0 | 0.5 | 0.5 | 0 |
| VINYBLAN (solid content) | 3 | 3 | 3 | 3 | 3 | 3 | 3 |
| P.B. 15:3 (cyan pigment) | 4 | 4 | 4 | 4 | 4 | 4 | 4 |
| Styrene acrylic resin | 1 | 1 | 1 | 1 | 1 | 1 | 1 |
| Residual is water |  |  |  |  |  |  |  |
| Surface tension | 31.8 | 29.7 | 25.6 | 32.1 | 29.9 | 25.6 | 24.4 |

TABLE 6

| Cyan Ink Composition | Surfactant | Surface tension (mN/m) | Recording Medium | White Ink Dryness Factor (%) | | | | | | | |
|---|---|---|---|---|---|---|---|---|---|---|---|
|  |  |  |  | 30 | 40 | 50 | 60 | 70 | 80 | 90 | 100 |
| A | E1010 | 32 | PET | x | x | x | x | ○ | ○ | x | x |
| B | BYK-348/0.05% | 30 | PET | x | Δ | ○ | ○ | ○ | ○ | x | x |
| C | BYK-348/0.5% | 26 | PET | x | Δ | ○ | ○ | ○ | ○ | x | x |
| D | E1010 | 32 | PVC | x | x | x | x | ○ | ○ | x | x |
| E | BYK-348/0.05% | 30 | PVC | x | Δ | ○ | ○ | ○ | ○ | x | x |
| F | BYK-348/0.5% | 26 | PVC | x | Δ | ○ | ○ | ○ | ○ | x | x |
| G | PD570/0.5% | 24 | PET | x | ○ | ○ | ○ | ○ | ○ | x | x |

Due to the result which are shown in Table 6, in the examples, the surface tension of the cyan ink is 30 mN/m or less in a case where BYK-348 which is manufactured by BYK Co., Ltd. was used as the surfactant. It is possible to obtain excellent image quality was obtained where the dryness factor of the white image was 50% to 80% with the cyan ink where the surface tension is 30 mN/m or less. At this time, there is no effect due to differences in the recording medium 200.

In addition, when Olfine PD-570 (manufactured by Nissin Chemical Industry Co., Ltd., a product which includes a surfactant where R in the formula (2) is a methyl group) is used as the surfactant, the surface tension is 24 mN/m and it is possible to obtain excellent image quality where the dryness factor of the white image was 40% to 80%.

Above, it is possible to confirm the effects described above in the embodiment through the examples and the comparative examples.

Here, the invention is not limited to the embodiments described above and it is possible to add various modifications, improvements, and the like to the embodiments described above.

For example, the recording method in the first recording process is not limited to an ink jet method.

The ink jet recording apparatus may be provided with a member of an analog coating method such as a bar coater, a slit coater, a roll coater, or the like, may perform the first recording process where the white image is recorded on the recording medium using a roll coater or the like, and may perform the second recording process where the color image is recorded using an ink jet method after the drying process has been performed.

In addition, as the ink jet recording method, the first recording process may be performed as an analog method such as a roll coating method. At this time, the roll coating method may be performed with a roll coater which is a separate apparatus.

The present disclosure claims priority under 35 U.S.C. §119 to Japanese Application No. 2011-240915 filed on Nov. 2, 2011, which is hereby incorporated by reference in its entirety.

What is claimed is:

1. An ink jet recording method, which performs recording on an ink non-absorbing recording medium, the method comprising:
   recording a white image on the recording medium using white ink that contains a white pigment and does not contain an alkyl polyol where the boiling point corresponding to an atmospheric pressure of 1 is 280° C. or more in practice;
   drying the white image to a dryness factor of 40% to 80%; and
   recording a color image on the white image with a dryness factor of 40% to 80% using an ink jet method using the color ink where the surface tension is 30 mN/m or less and which contains a colorant and does not contain an alkyl polyol where the boiling point corresponding to an atmospheric pressure of 1 is 280° C. or more in practice.

2. The ink jet recording method according to claim 1, wherein the amount of the white pigment which is contained in the white image which is recorded in the recording of the white image is equal to or more than 0.8 g/m².

3. The ink jet recording method according to claim 1, wherein one type or more which is selected from a group consisting of glycol ethers, polyether siloxane-based surfactants, and fluorinated surfactants of which an HLB value which is calculated using a Davies method is within the range of 4.2 to 8.0 is contained in the color ink.

4. The ink jet recording method according to claim 1, wherein an ink jet method is used for recording the white image on the recording medium using white ink in the recording of the white image, and the white pigment has an average particle diameter of 200 nm or more and 400 nm or less.

5. The ink jet recording method according to claim 1, wherein the recording medium is one type selected from polyethylene terephthalate, polyethylene, polypropylene, metal and glass.

6. The ink jet recording method according to claim 1, wherein the recording medium is polyvinyl chloride, and the white ink contains one or more types of aprotic polar solvent selected from pyrrolidones, sulfoxides, imidazolidinones, and amide ethers.

7. The ink jet recording method according to claim 1, wherein at least one of the white ink or the color ink contains 50 mass % or more of water.

8. An ink jet recording apparatus which uses the ink jet recording method according to claim 1.

9. An ink jet recording apparatus which uses the ink jet recording method according to claim 2.

10. An ink jet recording apparatus which uses the ink jet recording method according to claim 3.

11. An ink jet recording apparatus which uses the ink jet recording method according to claim 4.

12. An ink jet recording apparatus which uses the ink jet recording method according to claim 5.

13. An ink jet recording apparatus which uses the ink jet recording method according to claim 6.

14. An ink jet recording apparatus which uses the ink jet recording method according to claim 7.

15. A record which is recorded using the ink jet recording method according to claim 1.

16. A record which is recorded using the ink jet recording method according to claim 2.

17. A record which is recorded using the ink jet recording method according to claim 3.

18. A record which is recorded using the ink jet recording method according to claim 4.

19. A record which is recorded using the ink jet recording method according to claim 5.

20. A record which is recorded using the ink jet recording method according to claim 6.

* * * * *